No. 817,235. PATENTED APR. 10, 1906.
D. FARRAND.
SPRING WHEEL.
APPLICATION FILED MAY 20, 1905.

Witnesses
Charles Honigmann
Katherine Foltner

Dudley Farrand
Inventor
By his Attorney
Ross W. Forbes

UNITED STATES PATENT OFFICE.

DUDLEY FARRAND, OF NEWARK, NEW JERSEY.

SPRING-WHEEL.

No. 817,235. Specification of Letters Patent. Patented April 10, 1906.

Application filed May 20, 1905. Serial No. 261,331.

*To all whom it may concern:*

Be it known that I, DUDLEY FARRAND, a citizen of the United States, residing at Newark, in the county of Essex and State of New Jersey, have invented certain new and useful Improvements in Spring-Wheels, of which the following is a specification, reference being had therein to the accompanying drawings.

The invention relates to an improvement in vehicle-wheels, and particularly spring-wheels constructed and arranged to take up the shock and jar incident to load compression and irregularities of the road-bed.

The main object of the present invention is to provide a combined pneumatic and spring connection between the rim and hub of the wheel whereby to render the rim and hub capable of such independent radial movement as may be necessary to avoid transference of shock and jar to the vehicle proper.

Another object is to so brace the said connections contiguous to their junction with the hub as to provide against any independent lateral movement of the hub under possible load strain.

With the above objects in view the invention consists in certain details of structure and combinations of parts, which are clearly illustrated in the accompanying drawings and will be described in detail in the following specification.

Figure 1:
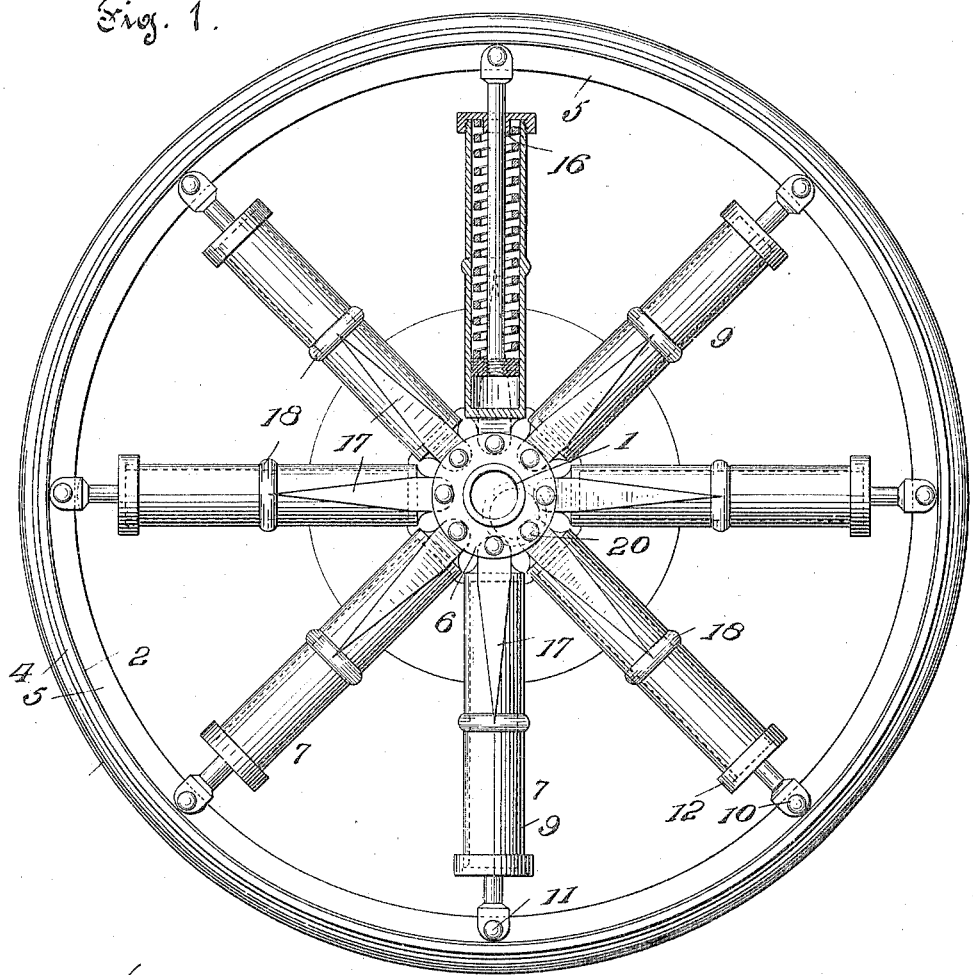
Figure 2:
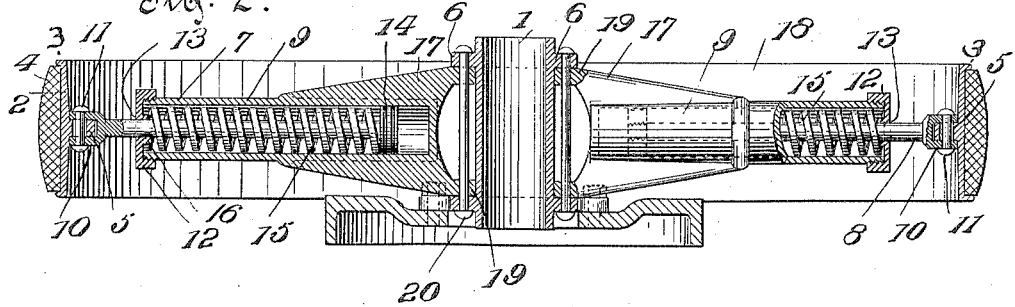

In the accompanying drawings, Figure 1 is a side elevation of a wheel constructed in accordance with my invention, one of the spokes being shown in section. Fig. 2 is a transverse central section of the same with one of the connections partly in elevation.

Referring to the drawings, my improved wheel comprises a hub 1, rim 2, and yielding connections, hereinafter termed "spokes" 7, joining said rim and hub. The particular details of the rim and hub are immaterial so far as the present invention is concerned, it being understood that the spoke construction forms the gist of my invention and that I contemplate their use with any preferred form of rim and hub. In the present instance, however, the rim 2 is shown as having radially-projecting edge flanges 3 to receive and secure a rubber or other tire 4; while the hub comprises the usual cylindrical boxing bored to receive the wheel-axle. The rim is provided on its inner surface with a centrally-arranged circumferential rib 5, and the hub with annular flanges 6, projecting radially from near the ends of the hub and providing therebetween a space to receive the inner ends of the spokes 7. The spokes 7, which are of course arranged radially of the wheel and in any desired number, are identical in construction, and a detailed description of but one will be necessary. Each spoke comprises two members—a stem 8 and a cylinder 9, the former being connected to the rim and the latter to the hub 1. The outer end of the stem is formed or provided with a bifurcated extension 10, designed to embrace the rib 5 and be pivotally secured thereto by a transversely-arranged bolt 11. The outer end of the cylinder 9 is open and arranged to be closed by a removable cap 12, the stem projecting within the cylinder in the assemblage of the parts, passing through an opening 13 in said cap. The inner end of the stem is provided with a piston 14, snugly fitting inside of the cylinder, and a compression-spring 15 is arranged to encircle the stem, terminally bearing against the cap and piston, as shown. The spring is arranged to resist outward movement of the stem, thereby preventing any rattle due to looseness of fit or wear of joints of parts, and is preferably diametrically equal to the interior dimension of the cylinder, with its upper terminal encircling an annular boss 16, depending from the cap. The cylinder is closed at its inner end and is of such length relative to the stem that in the normal position of the parts a space is maintained between the piston 14 and the inner end of the cylinder, whereby to provide a pneumatic cushion for the piston in its inward movement, as will be apparent. The suction of the piston in its outward movement tends to produce a partial vacuum behind it, thereby retarding its motion in such manner as to reinforce and assist the spring. To provide for the requisite strength of the cylinder without materially increasing the weight of the parts and also to provide lateral strain-resisting structure, I arrange diametrically opposite webs 17 on the cylinder-body. These webs extend from an annular strengthening-rib 18, arranged about midway of the length of the cylinder, to and beyond its inner end to provide ears 19, designed to engage with and between the hub-flanges 6 and be pivotally connected thereto by a transverse bolt 20. The webs 17 are preferably of gradually-increasing thickness in plan and longitudinal section from the rib 18 to the inner end of the cylinder, with the effect to provide the greatest thickness immediately adjacent to the hub connection and overlying the pneumatic chamber of the cylinder. This construction provides for strengthening the cylinder at the point of greatest strain and also in giving a broad base to the spoke construction as a whole to resist lateral strain.

The operation of the parts constructed and arranged as described will be fully apparent from the foregoing, it being understood that the combined spring and pneumatic cushion permit radial flexibility of the parts and effective take-up and absorb all shocks and jars incident to sudden starting and stopping of the vehicle and irregularities of the road-bed.

The flexibility of the wheel is materially increased by the pivotal terminal connections of the spokes, while the strengthening-webs described insure reliability of operation by guarding against lateral movement, thus increasing the resiliency and durability of the wheel.

What I claim as new is—

A vehicle-wheel including a rim, a flanged hub and spokes pivotally connected to the rim and hub, each of said spokes comprising a cylinder having external strengthening-webs extending lengthwise of the cylinder and projecting at the base thereof and pivoted to the hub-flange; a stem pivoted to the rim, and provided with a piston mounted in the cylinder; a spring-cushion above the piston and a pneumatic cushion beneath the piston within the cylinder.

In testimony whereof I affix my signature in presence of two witnesses.

DUDLEY FARRAND.

Witnesses:
   P. C. Oscanyan,
   Frank J. Davis.